A. LOOMIS.
MOTOR VEHICLE.
APPLICATION FILED OCT. 17, 1912.
1,275,950.
Patented Aug. 13, 1918.
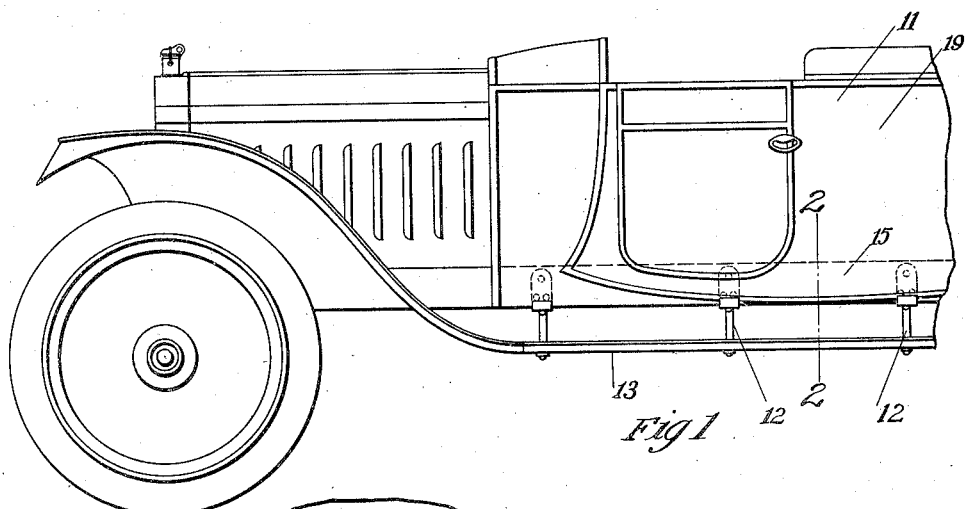
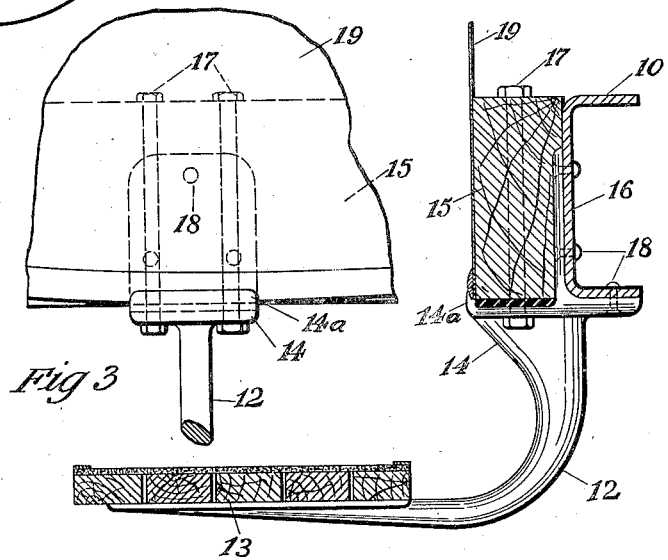
WITNESSES
INVENTOR
Allen Loomis
Attorney

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,275,950.  Specification of Letters Patent.  Patented Aug. 13, 1918.

Application filed October 17, 1912. Serial No. 726,298.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which is the following specification.

This invention relates to motor vehicles, and particularly to the body and frame construction.

One of the objects of the invention is to so mount the body on the frame that the body sills will not rest directly on top of the frame, but will be arranged, in part at least, below the upper edge of the frame.

Another object of the invention is to so construct the body with relation to the frame that the side panels of the body will extend down below the upper edge of the frame and thus give the body panels a deeper appearance.

Another object of the invention is to support the body and the step board on the frame by a common bracket.

Other objects of the invention will appear from the following description, taken in connection with the drawings, which form a part of this specification, and in which, Figure 1 is a side elevation of a motor vehicle embodying this invention;

Fig. 2 is an enlarged transverse sectional view on the line 2—2 of Fig. 1; and

Fig. 3 is an enlarged fragmentary side view.

It has been customary heretofore in motor vehicle construction to rest the body sills directly on the frame side members and secure the sill and frame together by bolts. This has necessarily raised the floor of the body, the thickness of the sill above the top of the frame, or if the floor is lowered to the level of the frame it is necessary for the occupant of the vehicle to step over the sill on leaving the vehicle. This construction also brought the side panels of the body to the upper edge of the frame, thus exposing the frame throughout the length of the vehicle or necessitating the frame being provided with splashers or guards to cover the various brackets thereon.

In the present invention the body sills are dropped below the upper edge of the frame and are secured against the outer side of the web of the frame side member, so that the frame is practically concealed by the body sill and by the panel which may drop down to the lower edge of the sill. In the invention as illustrated, the sill is supported on the frame by a lug or other suitable supporting means, forming a part of the side step bracket.

Referring to the drawings, 10 represents one of the side members of the frame of a motor vehicle, and 11 represents the body resting thereon. Spaced along the frame side member are brackets 12 of L shape and supporting the step 13. These brackets 12 are each formed with a lug or supporting part 14, upon which the sill 15 of the body is adapted to rest so that it is arranged outboard from the frame and may be secured to the bracket 12 against the web 16 of the frame, as by bolts 17. An upturned lip 14ª on the lug 14 prevents the sill 15 from springing outwardly. This brings the upper edge of the sill 15 flush with the upper flange of the channel section side member 10, as shown particularly in Fig. 2.

The brackets 12 are secured to the web 16 and the lower flange of the side member 10, as by bolts 18.

One of the panels 19 of the body 11 is shown as extending down to the lower edge of the sill, thus making the panel of greater depth than would be otherwise permitted.

From the above it will be seen that the body sills are supported outboard from the frame members and are secured against the side webs thereof, and the panels extend down to the lower edge of the frame and give the car a neater appearance than would otherwise be possible. Also it will be seen that the bracket 12 supports both the step 13 and the body sill 15, making a very practical and inexpensive construction.

Having thus described my invention, what I claim and desire to secure by Letters Patent, is,

1. In a motor vehicle, the combination with the frame side members and step brackets secured thereto, of a body resting on said step brackets and secured to the frame.

2. In a motor vehicle, the combination with the frame side members and step brackets secured thereto and having body supporting parts, of a body resting on said supporting parts, and means for securing said body to the frame.

3. In a motor vehicle, the combination of a frame side member, a body, a supporting bracket, and a foot board thereon, said bracket being fastened to the side of said frame member and supporting said body.

4. In a motor vehicle, the combination of a frame side member, a body, a supporting sill therefor, a supporting bracket, and a foot board thereon, said bracket being attached to the side of said frame member and supporting said sill.

5. In a motor vehicle, the combination with the frame side members and supporting brackets secured thereto, said brackets having supporting faces arranged below the upper edge of the frame members, lips on said supporting faces, of a body having sills resting on the supporting faces of said brackets in contact with said lips.

In testimony whereof I affix my signature in the presence of two witnesses.

ALLEN LOOMIS.

Witnesses:
ALFRED H. KNIGHT,
J. H. HUNT.